United States Patent
Dasdan et al.

(10) Patent No.: US 10,783,563 B2
(45) Date of Patent: Sep. 22, 2020

(54) METHODS AND SYSTEMS FOR MODELING CAMPAIGN GOAL ADJUSTMENT

(71) Applicant: Amobee, Inc., Redwood City, CA (US)

(72) Inventors: Ali Dasdan, San Jose, CA (US); Andrey Svirsky, Sunnyvale, CA (US)

(73) Assignee: Amobee, Inc., Redwood City, CA (US)

( * ) Notice: Subject to any disclaimer, the term of this patent is extended or adjusted under 35 U.S.C. 154(b) by 68 days.

(21) Appl. No.: 16/233,638

(22) Filed: Dec. 27, 2018

(65) Prior Publication Data

US 2019/0130457 A1 May 2, 2019

Related U.S. Application Data

(63) Continuation of application No. 14/040,505, filed on Sep. 27, 2013, now abandoned.

(60) Provisional application No. 61/768,744, filed on Feb. 25, 2013.

(51) Int. Cl.
 *G06Q 30/02* (2012.01)

(52) U.S. Cl.
 CPC ..... *G06Q 30/0275* (2013.01); *G06Q 30/0242* (2013.01); *G06Q 30/0269* (2013.01)

(58) Field of Classification Search
 CPC ........... G06Q 30/0275; G06Q 30/0269; G06Q 30/0242
 See application file for complete search history.

(56) References Cited

U.S. PATENT DOCUMENTS

| | | | |
|---|---|---|---|
| 6,523,170 B1 | 2/2003 | Cuomo et al. | |
| 7,523,395 B1 | 4/2009 | Namait et al. | |
| 8,386,398 B1 | 2/2013 | Hickman | |
| 2003/0018620 A1* | 1/2003 | Vishnubhotla | G06F 16/285 |
| 2003/0121000 A1 | 6/2003 | Cooper et al. | |
| 2009/0024468 A1 | 1/2009 | Broder et al. | |
| 2010/0138291 A1* | 6/2010 | Silverman | G06Q 30/0242 705/14.45 |

(Continued)

OTHER PUBLICATIONS

"PMML 4.2—General Structure", Data Mining Group, Retrieved from the Internet: <http://www.dmg.org/>, Accessed on Aug. 14, 2014, 13 pgs.

(Continued)

*Primary Examiner* — Sam Refai
*Assistant Examiner* — Kyle G Robinson
(74) *Attorney, Agent, or Firm* — Kwan & Olynick LLP

(57) ABSTRACT

A bid determination platform receives specifications for advertisements, each associated with a model configured to adjust a parameter value of a bid based on different combinations of user and/or media content characteristics associated with different advertisement requests. The platform also receives an advertisement request for placement of an advertisement on an advertisement space of a publisher's media content that has been requested by a user, and the advertisement request is associated with a set of user and media content profile data. For each of the advertisements, all or a subset of the set of user and/or media content profile data is input to each model so as to determine an associated parameter value. Bids for each advertisement are determined, with at least some bids being based on the associated parameter value. An optimum bid is sent with a location of its advertisement to the advertisement request sender.

20 Claims, 8 Drawing Sheets

(56) References Cited

U.S. PATENT DOCUMENTS

| | | |
|---|---|---|
| 2011/0184809 A1 | 7/2011 | Beavers et al. |
| 2011/0202409 A1* | 8/2011 | Chandrasekaran ............ G06Q 30/0271 705/14.67 |
| 2013/0006766 A1* | 1/2013 | Dedeoglu .......... G06Q 30/0251 705/14.53 |
| 2014/0067552 A1* | 3/2014 | Krueger ............. G06Q 30/0276 705/14.69 |
| 2014/0089106 A1* | 3/2014 | Jordan ............... G06Q 30/0202 705/14.71 |
| 2014/0108162 A1* | 4/2014 | Kumar .................. G06Q 30/02 705/14.72 |
| 2014/0304086 A1 | 10/2014 | Dasdan et al. |
| 2015/0302460 A1 | 10/2015 | Gailey et al. |
| 2015/0317678 A1 | 11/2015 | Huang et al. |

OTHER PUBLICATIONS

Agarwal, Deepak et al., "Estimating Rates of Rare Events with Multiple Hierarchies through Scalable Log-linear Models", KDD'07, San Jose, CA, ACM 978-1-59593-609-7/07/0008, 20047, 10 pgs.

Graepel, Thore et al., "Web-Scale Bayesian Click-Through Rate Prediction for Sponsored Search Advertising in Microsoft's Bing Search Engine", Proceedings of the 27th International Conference on Machine Learning, 2010, 8 pgs.

Lee, Kuang-Chih et al., "Estimating Conversion Rate in Display Advertising from Past Performance Data", KDD'12, Beijing, China, ACM 978-1-4503-1462-6 /12/08, 2012, 9 pgs.

Mansour, Yishay et al., "Doubleclick Ad Exchange Auction", arXiv: 1204.0535v1, Apr. 2, 2012, 8 pgs.

Richardson, Matthew et al., "Predicting Clicks: Estimating the Click-Through Rate for New Ads", WWW, Banff, Alberta, Canada, ACM 978-1-59593-654-7/07/0005, 2007, pp. 521-529.

\* cited by examiner

```
<Node score="1.0" id="id1">
 <Node score="0.85" id="id1">
  <SimplePredicate field="STATE"
                   operator="equal"
                   value="CA"/>
  <Node score="0.75" id="id1a">
   <SimplePredicate field="DMA"
                    operator="equal"      } 306a  } 304a
                    value="823"/>
  </Node>
  <Node score="0.95" id="id1b">
   <SimplePredicate field="DMA"
                    operator="equal"      } 306b
                    value="824"/>                           } 300
  </Node>
 </Node>
 <Node score="1.07" id="id2">
  <SimplePredicate field="STATE"
                   operator="equal"       } 304b
                   value="OR"/>
 </Node>
</Node>
```

*Figure 3A*

Goal Adjustment Models — 350

Name:* _____ — 354

File with PMML:* [Choose File] No file chosen — 354

Media channels:*  ☑ Display
                  ☐ Video     } 356
                  ☐ Mobile

[Upload]

*Figure 3B*

METHODS AND SYSTEMS FOR MODELING CAMPAIGN GOAL ADJUSTMENT

CROSS-REFERENCE TO RELATED APPLICATIONS

This application is a continuation of US Patent Application 14/040,505 entitled: METHODS AND SYSTEMS FOR MODELING CAMPAIGN GOAL ADJUSTMENT filed on Sep. 27, 2013, which claims the benefit of U.S. Provisional Application No. 61/768,744 filed on Feb. 25, 2013. These applications are incorporated herein by reference in their entirety for all purposes.

TECHNICAL FIELD OF THE INVENTION

The present invention relates to on-line advertising, and more specifically to managing bids for advertisement placement and the like.

BACKGROUND

In online advertising world, advertisers try to market their product to many users by embedding their ads within various online contexts such as web pages, videos, mobile apps, social networks, and the like. One general purpose of an advertiser is to reach the most receptive on-line audience in the right context at the right time, while minimizing their advertisement budget. The expectation is that the users who have seen these ads in particular contexts will either recognize the brands communicated by the ads or perform a desired action, such as buying an on-line product or clicking on the ad.

Publishers, who grab part of the attention of their audience (or users) via their online content, can sell their inventory, e.g., impression opportunities, via real-time ad exchanges. Publishers generally may want to get the highest cost for their inventory, whereas advertisers generally may want to pay the lowest price for the publisher inventory. Bids for purchasing real-time impressions for placement of ads from different advertisers are often negotiated in real-time via real-time bidding (RTB) exchanges. The RTB exchanges are the markets that determine the price of a match between an ad and an impression opportunity. RTB exchanges generally determine the optimal price of a match by running an auction for each impression opportunity.

It would be beneficial to provide improved systems and methods for facilitating the finding of optimum matches between ads and impressions, especially so that advertisers can more likely reach on-line audiences in targeted contexts.

SUMMARY OF THE INVENTION

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In general, certain embodiments of the present invention provide mechanisms for receiving at a bid determination system, such as demand side platforms (DSPs), models that are configured to determine custom bids for an advertisement based on different user and/or media content profiles associated with a bid request for purchasing an advertisement space. For instance, the model may be specified in a Predictive Modeling Markup Language (PMML) file, which represents data processing and analytics for receiving real-time sets of defined input values and outputting a real-time goal adjustment or final goal value, which is then used in determining or computing a bid.

In one embodiment, a method for bidding on placement of an advertisement within media content that is deliverable within a computer networking environment is disclosed. A bid determination platform receives specifications for a plurality of first advertisements that are each associated with a model configured to adjust a parameter value of a bid based on a plurality of different combinations of user characteristics and/or media content characteristics associated with different advertisement requests and/or advertisement characteristics associated with different advertisements. The bid determination platform also receives a first advertisement request for bidding for placement of an advertisement on a first advertisement space that is within a first publisher's media content that has been requested by a first user, and the first advertisement request is associated with a first set of user characteristics profile data and media content characteristics profile data. For the first advertisement request and each of the first advertisements, all or a subset of the first set of user characteristics profile data and/or media content characteristics profile data and/or advertisement characteristics data associated with such each first advertisement is input to each of the models so as to determine an associated parameter value. A plurality of bids for placement of the plurality of first advertisements on the first advertisement space is determined, and at least a first portion of the bids are determined based on the associated parameter values. An optimum one of the determined bids is determined and sent, along with a reference to the optimum bid's associated advertisement, from the bid determination platform to a sender of the first advertisement request.

In a specific implementation, the first advertisement request is received through a bid exchange system from the first publisher, and the optimum bid is sent to the first publisher via the bid exchange system if the optimum bid is a winning bid for finalizing purchase of placement of the associated first advertisement on a first advertisement space.

In another embodiment, the bid determination platform receives specifications for a plurality of second advertisements that are each associated with a constant bid goal value and a plurality of constraints, and the second advertisements is filtered for the first advertisement request based on whether the first set of user profile and media content characteristics profile data and/or advertisement characteristics data associated with such each second advertisement meet each of the second advertisement's constraints. Determination of the second portion of the plurality of bids is based on the constant goal values of the filtered second advertisements. In a further aspect, the received specifications of the first advertisements are each further associated with a plurality of constraints, and the method further includes filtering the first advertisements based on whether the first set of user characteristics profile data and/or media content characteristics profile data and/or advertisement characteristics data associated with such each first advertisement meet each of the first advertisement's constraints, wherein the first portion of bids are only determined for the filtered first advertisements.

In another embodiment, the models are each configured for real-time computation of a different parameter value, which corresponds to a different bid goal value, for each individual impression and its associated user characteristics profile data and/or media content characteristics profile data that is associated with such each individual's a bid request. In a further aspect, each first advertisement is further associated with a base bid goal value that is scaled by an output from the associated model. In another aspect, the bid goal value of each model that is computed for each impression is equal to a cost per action (CPA) value. In yet another aspect, the bid goal value of each model that is computed for each impression is equal to a cost per click (CPC) value. In another example, the bid goal value of each model that is computed for each impression is equal to a cost per million impressions (CPM) value.

In a further aspect, the specifications for the plurality of first advertisements are received by (i) at the bid determination platform, receiving a plurality of model files from a plurality of first advertisers or model builders, wherein the model files are in a predictive modeling markup language (PMML) format and describe the models, (ii) at the bid determination platform, receiving campaign specifications from at least some of the plurality of first advertisers and/or model builders, wherein each received campaign specification attaches a specific one of the first advertisements to an associated one of the model files, and (iii) deploying each model by converting each model file into a corresponding executable model for use in determining a bid for the corresponding, attached first advertisement if such model file and executable model passes a set of predefined criteria. In a further aspect, the predefined criteria include a requirement that each model file only use a predefined set of variables as input for its described model. In another example, at least one of the deployed models are specified as sharable and attached to different first advertisements in different campaign specifications from different advertisers. In a further aspect, a first one of the deployed models is sold to a particular one of the first advertisers or model builders, who was not involved with creating a model file for generating such sold first deployed model.

In another implementation, at least one of the models is configured for real-time computation of a different parameter value for different user characteristics, which include age, gender, and location of the corresponding user. In a further aspect, the location of the corresponding user includes a state and direct marketing area (DMA). In another implementation, at least some of the models are configured to determine a probability of a user action with respect to an advertisement.

In yet another embodiment, at least some of the models are configured to adjust a parameter value of a bid further based on a plurality of different combinations of media content characteristics associated with different advertisement requests. In another aspect, at least some of the models are configured to adjust a parameter value of a bid so as to result in a zero bid value for an advertisement request that is not associated with a particular set of user and media content characteristics.

In another example, at least one of the models is configured to adjust a parameter value of a bid based on a plurality of different combinations of user characteristics associated with different advertisement requests. In a further aspect, the different combinations of user characteristics include different combinations of user demographics and different other contextual factors that affect user behavior differently. In another implementation, at least some of the models are configured to adjust a parameter value of a bid based on different combinations of user characteristics and media content characteristics. In yet another embodiment, at least one of the models is configured to adjust a parameter value of a bid based on different combinations of user characteristics, media content characteristics, and advertisement characteristics. In another embodiment, a plurality of models is received from a plurality of first advertisers or a plurality of model builders, and receiving the specifications for the first advertisements comprises at least some of the first advertisers associating specific ones of the first advertisements with specific ones of the received models.

In another embodiment, the invention pertains to an apparatus having at least a processor and a memory. The processor and/or memory are configured to perform one or more of the above described operations. In another embodiment, the invention pertains to at least one computer readable storage medium having computer program instructions stored thereon that are arranged to perform one or more of the above described operations.

These and other features of the present invention will be presented in more detail in the following specification of certain embodiments of the invention and the accompanying figures which illustrate by way of example the principles of the invention.

BRIEF DESCRIPTION OF THE DRAWINGS

FIG. 3A illustrates an example goal adjustment model file that is expressed in a predictive modeling markup language (PMML) in accordance with a specific implementation of the present invention.

FIG. 3B illustrates an example interface for inputting a goal adjustment model file in accordance with one embodiment of the present invention.

DETAILED DESCRIPTION OF THE SPECIFIC EMBODIMENTS

In the following description, numerous specific details are set forth in order to provide a thorough understanding of the present invention. The present invention may be practiced without some or all of these specific details. In other instances, well known process operations have not been described in detail to not unnecessarily obscure the present invention. While the invention will be described in conjunction with the specific embodiments, it will be understood that it is not intended to limit the invention to the embodiments.

Figure 1:
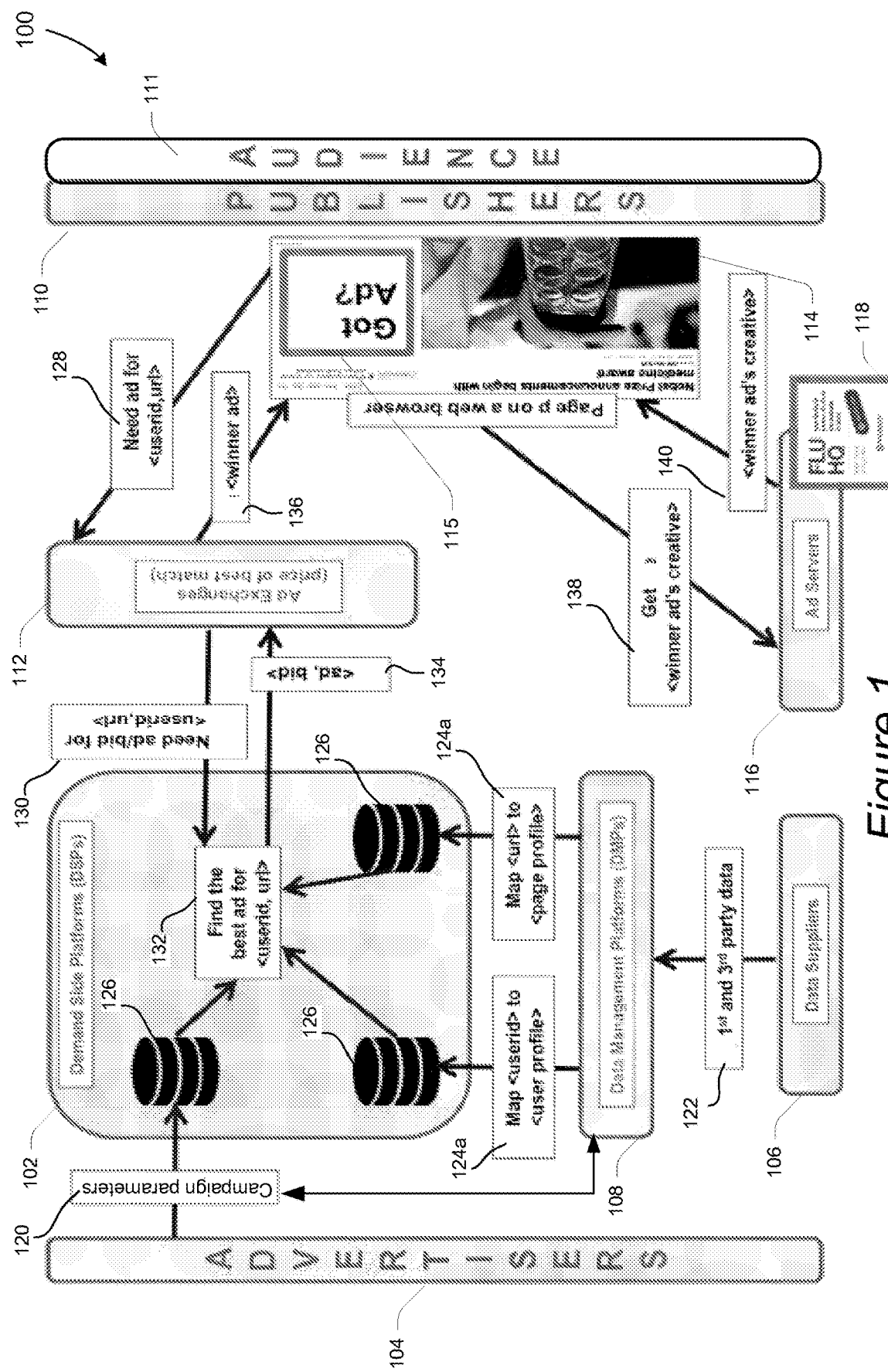
FIG. 1 is a diagrammatic representation of a simplified computer network in which advertisement processes may be implemented.

FIG. 1 is a diagrammatic representation of a simplified computer network 100 in which advertisement processes may be implemented. A real-time bidding flow will be described with respect to this system 100. At a high level, this flow can be considered in three main sections: the demand side on the left, the ad exchange 112 in the middle, and the supply side on the right. In reality, a real-time bidding ecosystem is fairly complex and may include any suitable number and type of components for providing advertisements to audience users.

Publishers 110 may provide any suitable type of displayable, executable, audible, or visual media content to users/audience 111 via a user's device or on the publisher's device or system. For example, media content may include videos, music, text, games, etc. Publishers may provide various categories of content, such as news, entertainment, educational, finance, sports, travel, etc. In a specific implementation, publishers provide media content, such as web pages, from server devices to client devices that are accessible by audience members/users. Example client devices include tablet computing devices, laptop computing devices, personal digital assistant (PDA) devices, mobile phones (e.g., smart phones), desktop computer, televisions, wearable computers, household devices, etc. Each client device may be configured with any suitable hardware and/or software (e.g., browsers and browser add-ins plug-ins, operating systems for downloading and execution of apps on mobile devices) that operates in cooperation with the publisher devices/systems for receiving and presenting media content.

Prior to providing requested media content to users 111, the Publishers 110 may also sell ad spaces with respect to such media content. Advertisers 104 at the demand side have ads to place with publisher-provided media content. In general, what is actually bought (demanded) and sold (supplied) is a tiny fraction of the attention of online users (the audience 111 in the advertising terminology) as they obtain media content from or on publishers' sites. For instance, an advertiser 104 pays to have an ad placed in an ad space of a particular web page that is sold by a publisher. Although the following system 100 and flow is described with respect to ad spaces in web pages, the following processes may be implemented for other types of ad spaces in other types of media, such as mobile device apps, games, coupons, videos, etc.

The ad exchange system 112 generally runs an auction to determine a price of a match between an ad and a web page. In essence, ad exchanges are the markets providing mechanisms for facilitating bidding processes between the demand and supply sides. The ad exchanges may be implemented on any suitable number and type of computing devices.

Demand side platforms (DSPs) 102 may be generally configured to manage advertising campaigns on behalf of advertisers 104 although some advertisers may also work directly with ad exchanges. Given a user requesting a particular web page, a DSP 102 is able to find the best ad for the user (111). The best ad may be selected from the ads managed by the DSP. For each ad selected, various constraints (mostly selected by the advertisers, but some by the ad exchange, the publisher, and the DSP) are met.

Figure 2:
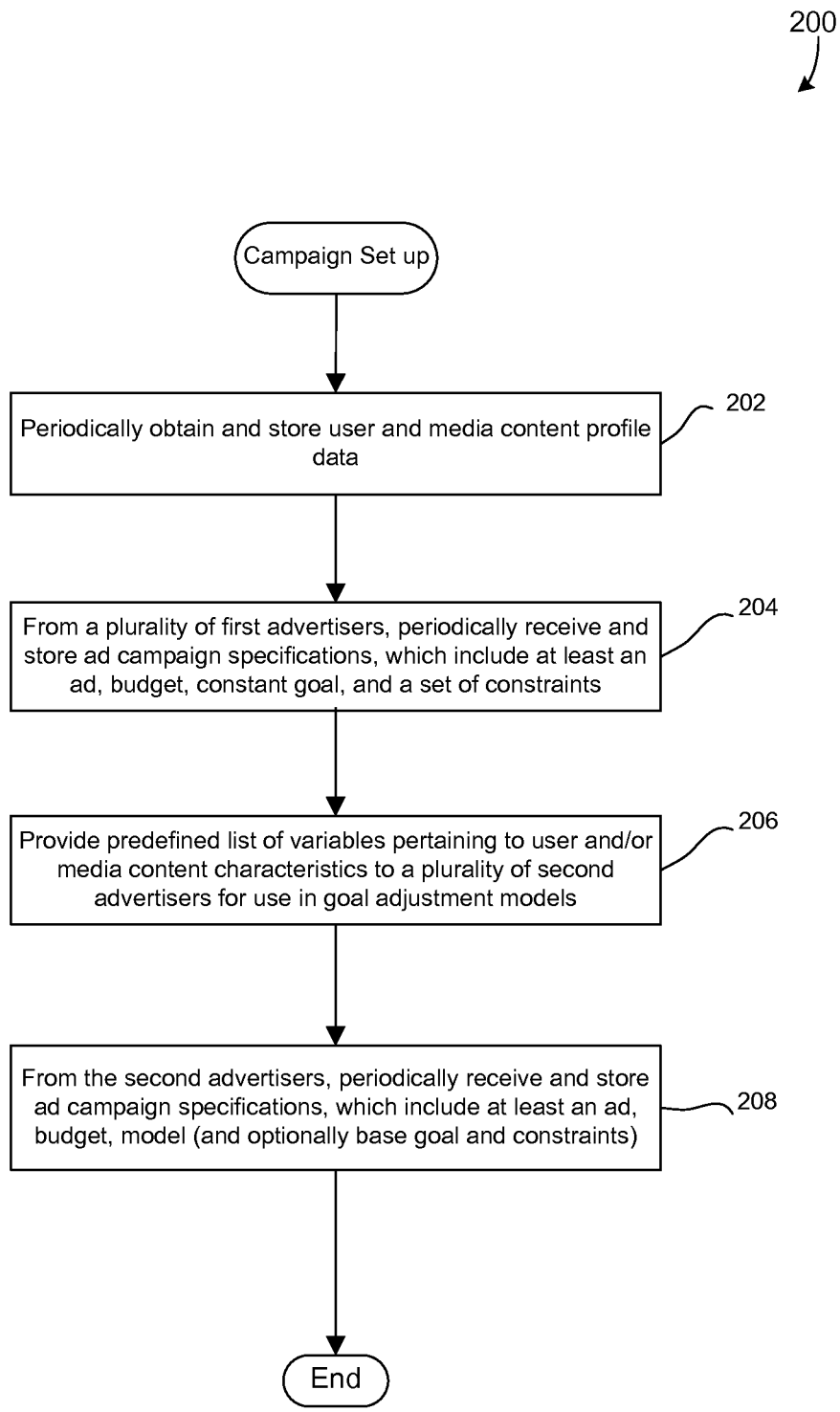
FIG. 2 is a flow chart illustrating a process for setting up ad campaigns in accordance to one aspect of the present invention.

FIG. 2 is a flow chart illustrating a process 200 for setting up ad campaigns in accordance to one aspect of the present invention. Although this process 200 (as well as other processes) described herein is shown as a sequence of blocks or operations, one or more blocks may each be implemented by jobs that are run in identical, overlapping, or non-overlapping time frames. The DSP in this example flow will be denoted by D.

User and media content profile data may be periodically obtained and stored in block 202. For instance, DSP D may receive and store user and page profiles in an accessible profile database (such as 126 of FIG. 1), which may be implemented by any suitable type and number of storage devices. The DSPs 102 may obtain the user profile and page profile data from a plurality of data management platforms (DMPs) 108, which may be configured to aggregate and data-mine all kinds of advertising and non-advertising data. One specific use of DMPs is to extend the audience known to an advertiser through analysis of various audience data from various third-party data vendors. DSP D may be integrated with its DMP or other third-party DMPs.

The user and media content profile data may be obtained or accessible as $1^{st}$ and $3^{rd}$ party data (122) from various data suppliers (106), such as first parties (the advertisers themselves) or third parties (independent data suppliers). In the example of FIG. 1, the DSPs 102 obtains mappings between user profile data and user IDs (124*a*) and mappings between page profile data and universal resource locators or URLs (124*b*). The user profile data is preferably fully anonymized so as not to contain any personally identifiable information. For instance, a user login, device identity (such as MAC address) may be associated with user profile information, which does not include the user's actual name or address, etc. Similarly, a unique identity for the specific media content (and/or ad space) may be associated with specific characteristics.

Advertisers who work with D may provide campaign parameters or specifications (120) to D. The advertisers may specify any suitable campaign parameters for running a particular ad campaign. For each campaign, an advertiser may specify at least a budget, an ad, a goal, and a set of constraints, sometimes referred to as targeting constraints. An ad campaign's budget B may be specified to be spent over a given time period, sometimes referred to as a budget schedule. At the end of a campaign, if the money spent (S) is less than or greater than B, the campaign is said to be underspent or overspent, respectively. A campaign that is not spending as expected is said to be over- or under-delivering. It is also possible to assess how much a campaign is delivering at any point during the time period it runs.

For a branding type campaign, the idea may be to reach as many unique users as the campaign budget affords at a constant cost per impression. This goal may be expressed as CPM, the cost per mille or one thousand impressions. After some budget is spent, the ratio of the budget spent to the total number of impressions received is called eCPM, the effective CPM. For a flat CPM campaign, as long as some impressions are paid for, eCPM=CPM by definition. It should be noted that the DSP D can charge a service fee, a data usage fee, and other fees before submitting bids, hence, the CPM specified by an advertiser is usually an upper bound on the bid that gets submitted.

For a performance type campaign, the advertiser may wish to reach as many unique users as the campaign budget affords but to do so while keeping within certain performance goals. The performance goals may be expressed as CPC or CPA, the cost per click or the cost per action or conversion, respectively, although there may be other performance goals depending on the media content type, e.g., cost per engagement for a video advertisement. The goal associated with a segment of users may reflect the value of reaching those users for the advertiser. In advertising terminology, the part of the campaign customized to this segment of users is sometimes called a package. The term CPA may be used herein for both CPA and CPC for brevity and without loss of generality.

A CPA campaign can be run as a pure CPA campaign or a dynamic CPM (dCPM) campaign. In the pure version, the advertiser is willing to spend a budget for a CPA goal, irrespective of how much money the DSP ends up spending to satisfy the agreed CPA goal. In other words, the DSP takes all the risk in this pure version.

In the dCPM version of a performance campaign, the advertiser is willing to spend a budget for a CPA goal and the DSP tries to satisfy the goal without taking any risk. In this version, the DSP usually charges a small service fee per impression or overall for running the campaign. The DSP can also charge other fees such as a data usage fee if the advertiser uses data from a third-party data vendor or from the DSP. This version is called the dynamic CPM because the advertiser is also expected to specify an upper bound on the effective CPM of the campaign (e.g., the average CPM over all impressions).

In any CPA campaign, the goal CPA may be compared against the effective CPA (eCPA), which is the ratio of the budget spent to the total number of actions received. With eCPM defined, a pure CPA campaign can be formulated so as to minimize eCPA subject to $|B-S| \leq \epsilon$. On the other hand, a dCPM campaign can be formulated so as to minimize eCPA subject to $|B-S| \leq \epsilon$ and eCPM$\leq$CPM, where CPM is the upper bound on eCPM. In both formulations, B corresponds to budget amount, while S corresponds to the spent amount. E is a small bound on overspend or underspend. For both cases, it is also possible to express the objective function as the maximization of a return-on-investment (ROI), defined as the goal CPA divided by eCPA.

An advertiser may also specify targeting constraints for an ad campaign. In general, constraints may specify what kind of users to reach on what kind of media content, how long to run the campaign, etc. A single user constraint can serve to partition a set of users into those users who satisfy the constraint and those users who do not. In general, constraints can be based on any combination of characteristics from a particular user's profile, a particular media content profile, or other parameters that are obtainable for a particular ad request. Example constraints may pertain to user demographics, user browsing history, user geographic location data, media content categories, ad or ad space characteristics, user contextual parameters (e.g., weather, time of day, stock market indexes, etc.), advertiser categories, etc. In general, user contextual parameters may include any contextual parameter that may affect a user or advertiser's behavior.

While constraints may be used to filter certain users, media content, ad spaces, and/or publishers from being targeted by a particular ad campaign or package, an advertiser may find it very difficult to partition different segments of "targeted users" into multiple segments of users, media content, ad spaces, and publishers that are valued differently by the advertiser. For instance, an advertiser may express each segment using a set of constraints that are mapped to a package under the same top-level campaign. For a CPA campaign, each segment may have a different CPA goal (expressed as the goal of the corresponding package). In a simple example, if an advertiser has a different performance goal for users from each state in the United States, this implies 50 segments in the target set. If the value also changes from zip code to zip code (about 41K in the US) and per the age bucket of the user (about ten), the campaign can then have 1000 s of segments, each with a different constant goal value. Of course, other types of goals, such as CPC and CPM, can alternatively be specified as constants.

The DSP may be configured to manage campaigns that specify constant goal values, for example, for different packages of targeted user segments. Referring back to FIG. 2, ad campaign specifications, which include at least an ad, budget, constant goal, and a set of constraints, may be periodically received from a first set of advertisers (204). The ad may have a number of associated ad attributes or characteristics, such as ad category, ad format, campaign parameters, etc. This first type of advertisers may specify a large number of segments through multiple packages. However, such a large number of packages with constant goal rates can become unmanageable for a campaign manager. This constant goal approach may make the number of packages exponentially large in order to target all combinations of multiple user characteristic values, including user demographics, and context parameters pertaining to how, where, and when the user is requesting particular media content. If the number of segments gets too large, the DSPs processing resources may also become strained and overburdened due to the large number of objects to deal with across multiple data centers.

To keep the number of packages under control and manageable, an advertiser may choose to target a larger segment per package with a single goal value. This approach, on the other hand, may impose a goal that is too high or too low for some of the subsets of the targeting set so that under-spending or over-spending occurs. A more extreme case occurs when the value of a set of targeted users depends on an almost continuous parameter, which cannot be represented by a constant goal value.

In contrast to a first set of advertisers who specify a different constant CPA goal (or other constant goal) for each segment of users and the like, certain embodiments of the present invention allow advertisers to specify a performance goal as a function of a set of user or media content profile characteristics, instead of a constant value, which may be applied across multiple segments. Some or all constraints for different user, media content, ad space, ad, and publisher segments may be subsumed by a model for determining or adjusting a performance goal. For example, the performance goal may be set to zero if none of the model's absorbed constraints are met.

Alternatively, a model may be used to specify other types of adjustable goals, such as CPC or CPM. Additionally, a model for determining action rate or probability of a particular action, such as click or conversion, may be provided by an advertiser although the following examples are described with respect to models for adjusting bid goals. Certain techniques of the present invention allow on-the-fly, real-time computation of the goal per impression as described further herein.

In specific embodiments of the present invention, some of the campaign goals are specified at least, in part, by one or more goal adjustment models. Referring back to FIG. 2, a predefined list of variables pertaining to user and/or media content characteristics may be provided to a plurality of second advertisers for use in goal adjustment models (206). These second advertisers may create a goal adjustment model for adjusting goal values for different user and/or media content profile characteristics (or other parameters provided in the ad request) for different ad requests by the same or different publishers. Ad campaign specifications, which include at least an ad, budget, goal adjustment model, (and optionally base goal and constraints), from the second advertisers may then be periodically received and stored (208).

A goal adjustment model may be represented by any suitable format for specifying data processing and analytics for receiving real-time sets of defined input values and outputting a real-time goal adjustment or final goal value. In a specific implementation, the predictive modeling markup language (PMML), an XML-based markup language for predictive modeling and analytics, is used to describe the goal adjustment model. FIG. 3A illustrates an example goal adjustment model file 300 that is expressed in PMML in accordance with a specific implementation of the present invention. This example PMML file expresses a single segment with a few rules involving two states and two DMA's.

For simplicity, this example model file 300 assumes a constant base goal CPA, which is provided separately for the associated campaign. For instance, the model outputs an adjustment score in the form of a scale factor that is to be multiplied with the base goal CPA to obtain a final adjusted goal. This example model file 300 includes section 304a that specifies the goal as 0.85 CPA for any user residing in any designated market area (DMA) or TV marketing region in the state of California, except for the DMA 823 and 824, the goals are 0.75 CPA as specified by sub-portion 306a and 0.95 CPA as specified by sub-portion 306b, respectively. Moreover, model file 300 includes section 304b that specifies that the goal is equal to 1.07 CPA for any user residing in the state of Oregon. Otherwise, the model file 300 states that the goal is equal to the original base CPA (1.0× CPA) for all other states.

Even this simple model file 300 illustrates a significant saving in the number of segments, as compared to the number of segments for specifying different constant CPA goal values. The number of segments with constant goals to express the same logic would be at least four.

A PMML model file may generally include a data dictionary portion for defining all possible model input variable (e.g., name, type, etc.), a data transformation portion for defining data pre-processing (e.g., normalization, discretization, mapping, aggregation, functions, etc.), and a model portion for defining the model itself. The model portion may define a model schema, one or more functions or algorithms that include one or more of the defined input variables and specified output (name and type), output post-processing, etc. The model schema may describe which defined input variables are used by the model, which can be a subset of data dictionary input variables, how each model variable is used by the model, how missing input variables are handled, how outliers are handled, etc. Functions may include if-then-else functions, Boolean operations, etc. The architecture of the model may represent a decision tree, a neural network, support vector machine, regression model, set of association rules, clustering model, Naïve Bayes classifier, text model, etc. Due to its XML basis, PMML can also be extended to support any machine learning or data mining model.

A model may be provided by an advertiser, for example, to a DSP in any suitable manner. For instance, an advertiser may provide a model file to a DSP separately from a campaign or together with a campaign. If a model file is provided separately, an advertiser may later attach one or more campaigns to such model file. A model file can also be sold for use by other advertisers or model builders. The DSP facilitating this sale can also charge the advertisers who use a model file on behalf of the model file provider. This charge-for-use can be similar to the way data use from data vendors is charged. In one example, the DSP provides a graphical user interface (GUI) to advertisers for inputting a model. The interface 350 may include any type of input mechanisms for entering data, such as text fields, pull-down menus, buttons, file browser interfaces, voice, facial expression, or gestural recognition interfaces, etc. The model input interface may also be presented to a user in multiple windows.

FIG. 3B illustrates an example interface 350 for inputting a goal adjustment model file in accordance with one embodiment of the present invention. As shown, the interface 350 may include a name input field 354 for the advertiser to enter a text name for a particular model, a file selection mechanism 354 for specifying the model file, and a plurality of selectable buttons 356 for specifying the type of media content or ad space to which the model can be applied. In the illustrated example, the advertiser may select from a display, video, and mobile button. The interface 350 may also include buttons for selecting other media content or ad space types, such as described herein.

Figure 3C:
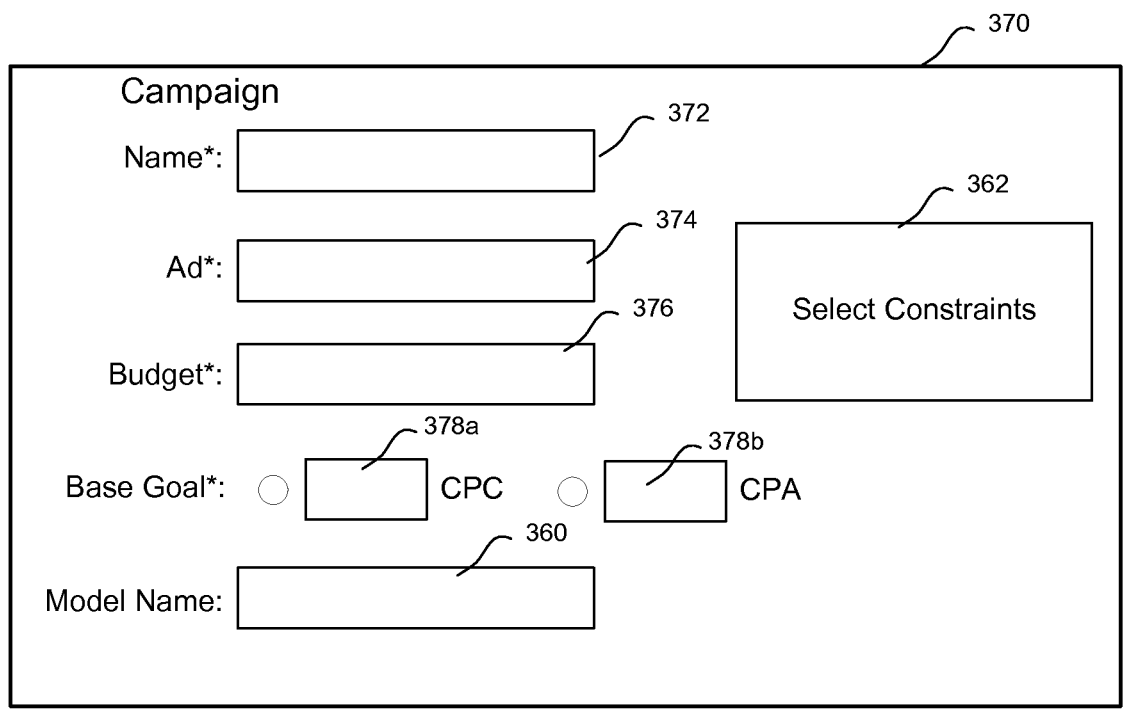
FIG. 3C illustrates an interface for an advertiser to specify various ad campaign parameters in accordance with one example embodiment.

FIG. 3C illustrates an interface 370 for an advertiser to specify various ad campaign parameters in accordance with one example embodiment. This interface 370 is simplified so as to not obscure the invention. However, a campaign interface may include any suitable mechanisms for facilitating an advertiser to input campaign parameters, including a model specification. As shown, the interface 370 may include a name field 372 for specifying the campaign's name, an ad input mechanism 374 for specifying one or more ads for use with the campaign, a budget field 376 for entering a campaign budget amount, a base goal input mechanisms for selecting and entering a particular initial goal (such as CPC value field 378a or CPA goal value field 378b), a model field 360 for specifying a particular model name, and a constraints input mechanism 362 for entering one or more user and/or media content constraints. The constraint mechanisms may be in the format of selectable graphics that are individually selectable for entering different types of restraints, such as audience, media content, publisher, and ad space constraints.

The ad input mechanism 374 may allow an ad creative (such as a display image, video, audio file, etc.) to be uploaded to the DSP and/or one or more ad servers. Alternatively, the ad input mechanism 376 may allow specification of a location of the ad creative (e.g., URL). In the illustrated example, an advertiser may select either a CPC type or CPA type goal via selectable buttons or other selection mechanisms and then enter a corresponding CPC or CPA value. Other types of goals may include cost per engagement, cost per call, etc. The constraints may include various tiered interfaces for selecting different types of users, media content, publisher, ad space categories, campaign duration, ad frequency, geographic location, browser type, device type, browser type, etc. In this example, a model name as previously provided with a model file may be identified by the advertiser so that the DSP may attach the corresponding model to the newly defined campaign. Of course, the interface may also include mechanisms for providing a new or edited model file (e.g., similar to the model file input mechanism of FIG. 3B).

Figure 3D:
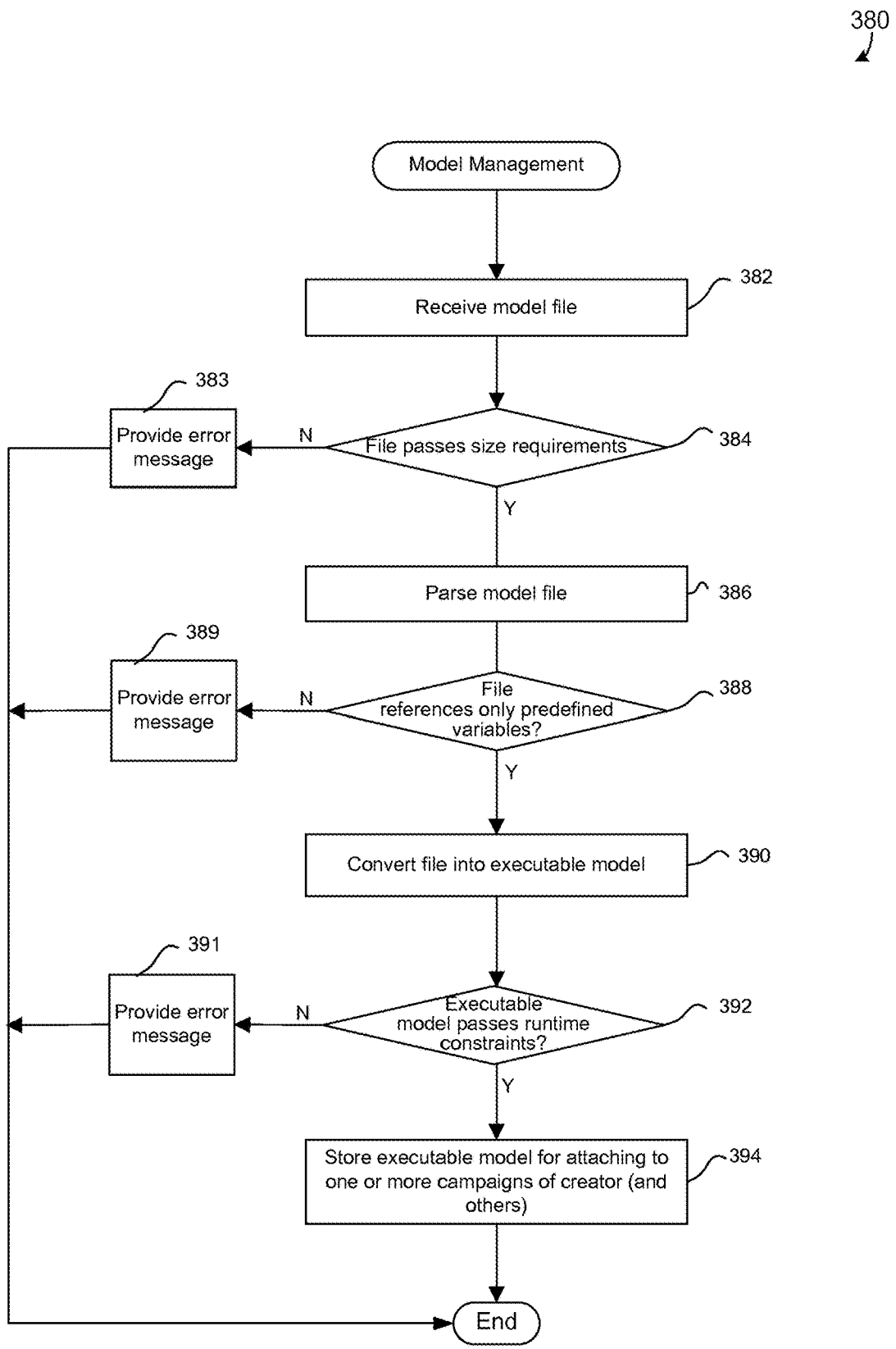
FIG. 3D is a flow chart illustrating a model management process in accordance with a specific implementation of the present invention.

Regardless of whether a model file is provided separately or together with a campaign, the DSP may be configured with any suitable model deployment mechanisms. FIG. 3D is a flow chart illustrating a model management process in accordance with a specific implementation of the present invention. Initially, a model file may be received in operation 382. It may then be determined whether the file passes any size requirements in operation 384. For instance, the file size may be required to be below a predetermined size threshold. The size threshold may be the same for all advertisers or vary between advertisers based on budget levels, quantity or frequency of historical or current campaign activity, etc. If the file does not pass size requirements, an error message may be provided in operation 383. This error message may specify that the model file has exceeded a size limit. The DSP may also be configured to provide the advertiser with an option to buy a higher size threshold.

If the model file passes size requirements, the model file may be parsed in operation 386. It may also be determined whether the model file references only predefined or authorized variables in operation 388. For instance, the DSP may only authorize a predefined list of variables pertaining to specific user, ad space, media content, or publisher characteristics for use with a model.

If the model file variables do not include unauthorized variables, the file may then be converted to an executable model in operation 390. An executable model may include code represented in a Java class. It may then be determined whether the executable model passes various runtime constraints, such as latency or memory requirements, in operation 392. Latency or memory requirements may be implemented in a manner similar to the implementation of the file size requirements described above. If the executable model does not pass, an error message may then be provided in operation 391. For instance, the advertiser may be informed that the model does not meet latency or memory limits and/or be given an opportunity to purchase higher limits. If the executable model passes, executable model may then be stored for attaching to one or more campaigns of the model creator in operation 394. In a specific implementation, each campaign, advertisement, and model is given a unique identifier or name so that they can be associated or attached together. That is, a specific campaign identifier, advertisement identifier, and model identifier may be associated with each other and such association can be stored for later determination of which advertisements and campaigns are associated with what models.

Any number of advertisers, besides the model creator, may also be authorized to use the new executable model. This model handling process 380 may be repeated for each newly created or edited model. The model creator may also be given an incentive to share their model with other advertisers. For instance, the model creator may be given a discount or credit for the fees given by the model creator/advertiser to the DSP for handling bids. An incentive can also be a fee that the DSP can charge on behalf of the model creator. Such incentives can create a market for model creators or vendors that are specialists for optimization rather than advertisers or agencies themselves.

Referring back to FIG. 1, Publisher P 110 may also work with an ad exchange E 112 to find ads for its pages. When a user u with a user ID <userid> is about to view a web page w(114 with URL <url> from the Publisher P, Publisher P sends an ad request 128 for an ad to be sold for a particular ad space 115 of the web page w 114 to ad exchange E 112. The ad exchange E 112 passes the request 130 to all partner DSPs 102, including D.

Figure 4:
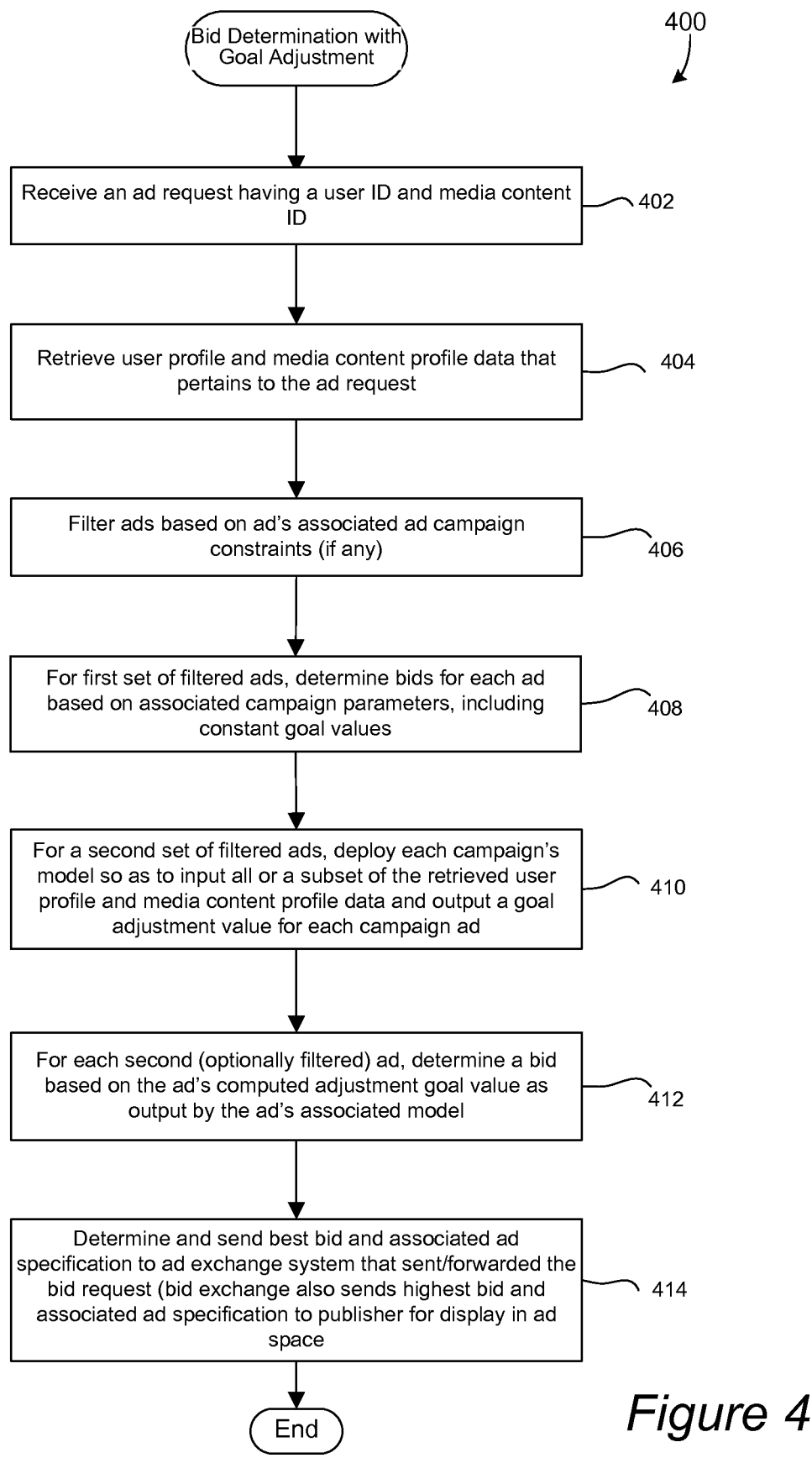
FIG. 4 is a flow chart of a bid determination process with goal adjustment in accordance with one embodiment of the present invention.

FIG. 4 is a flow chart of a bid determination process 400 with goal adjustment in accordance with one embodiment of the present invention. This bid determination process is described with respect to a single bid request received and handled by a single DSP D. However, it is understood that real-time bidding often involves a large number of bid requests sent by a large number of different publishers to a large number of real-time bid exchange systems and DSPs. For instance, some DSPs can receive and handle more than 1 million bid requests per second.

As shown, an ad request having user ID and media content ID (e.g., u and w) may be initially received (e.g., by DSP D) in operation 402. It is possible that ad requests also contain other information such as IP, user's browser type, etc. The DSP D may then obtain the user and media content profiles that pertain to the received ad request in operation 404. For instance, the DSP D retrieves user and media content profiles (and/or other type of data) that were previously stored and mapped to the user ID and media content ID (u and w), for example, from its profile data stores. Either profile may also be empty if u or w is new to D.

The user profile of user u may include any characteristics that were, are, or can be associated with the particular user u. To protect a user's privacy, user profile data may be stored with an anonymized type of user identifier, such as an arbitrary or randomized identity, rather than the user's actual name, specific residency, or any other type of user identifying information. Examples of user profile data that may have previously been stored for the particular anonymized user u may include demographic data, such as personal or professional interests, employment status, home ownership, knowledge of languages, age, education level, gender, race and/or ethnicity, income, marital status, religion, size of family, field of expertise, residential location (country, state, DMA, etc.), travel location, etc. The user profile data may also include browsing history information, such as pages visited, amount of time per page viewing, links clicked on, searches performed, actions or interactions taken, amount and type of purchases made, etc. The browsing history information may be expressed using any suitable one or more metrics, such as count, absolute or relative value, average, mean, frequency, time duration, etc. The user profile of user u may also include contextual data, such as where the user is currently located, the weather at such location, current events at such location, etc. For instance, the ad request may include a GPS (global positioning satellite) value or access point location for the user u, and other contextual data may be scraped from other databases, such as a weather or entertainment event web site for such location. The media content profile may identify various characteristics of the web page or ad space that is available for purchase, such as one or more content category, ad placement position (e.g., top, side, or bottom of page), ad type (e.g., banner, video, pop-up), etc.

The DSP D may then run various optimization algorithms (132) to find the best ad for u and w. This optimization may include optimizing for the ads' campaign goals while satisfying constraints. The DSP may work with a variety of advertisers who utilize different campaign types. A first set of campaigns may utilize flat CPA goals for each package or segment of users or media content. That is, different packages may have a different set of constraints and different constant CPA values. The packages of a particular campaign may have the same ad or a custom ad for the particular segment of users or media content.

A second set of campaigns may have associated models to adjust CPA values for each impression based on any characteristics of the particular user or media content. Additionally, one or more of these second campaigns may use constraints, in addition to a model. In sum, constraints on user and media content profile parameters, as well as other types of parameters available in the ad request, can be completely or partially subsumed by the model.

Referring back to FIG. 4, the DSP D may first filter ads based on ad's associated ad constraints (if any) in operation 406. For instance, one particular ad constraint specifies that this particular ad only applies to users from California. Accordingly, if the ad request has a user u who is from Oregon, this particular ad is filtered from the candidate ads. In contrast, if another ad has an associated constraint specifying users from Oregon, this other ad is not filtered for the ad request for an Oregon user and such other ad is deemed to be a candidate ad for further bid processing.

Bids may then be determined for each of a first set of filtered ads based on the ad's associated campaign parameters, such as a constant CPA, in operations 408. For an ad having a constant CPA, the bid b may be computed as:

$$b = p(u; w; a) \times \text{CPA} \quad [1]$$

where p(u;w; a) is the probability of action given u, w, the ad a, and optionally other related parameters in the bid computation context. This probability may be computed using any suitable techniques, such as a machine learning algorithm. Several example techniques are described in the paper: D. Agarwal, R. Agrawal, and R. Khanna, "Estimating rates of rare events with multiple hierarchies through scalable log-linear models", ACM SIGKDD Conf. on Knowledge Discovery and Data Mining, 2010, which paper is incorporated herein by reference for providing a technique for determining probability of an actions, such as click or conversion.

CPA in Equation [1] may be a constant CPA value. Of course, CPA may be replaced with a constant CPC or CPM value (converted to a cost per impression). At least some input for determination of this probability p is provided in the bid request itself. In the CPM example, the bid b is equal to the advertiser specified CPM minus the fees charged by the DSP.

The bid determination techniques described herein may also factor in the corresponding ad campaign or package budget and a specified time frame for such budget to be spent. For instance, if ad purchases for a particular campaign are underspent by more than a predefined amount, the bid amounts may be increased. Likewise, if the ad purchases are overspent by more than another predefined amount, the bid amounts may be decreased. Moreover, a campaign budget can be periodically allocated to different packages of a campaign using an algorithm. The periodic allocation can consider the spend amount and performance levels of each package for allocating more or less budget to these packages.

For a second set of (optionally filtered) ads that have associated goal adjustment models, each model can be deployed so that all or a subset of the retrieved user profile and media content profile data (as well as ad attribute data) is input to such deployed model and a goal adjustment value is output in operation 410. For each second ad, the bid is determined based on the ad's computed adjustment goal value as output by the corresponding model in operation 412. In one implementation, a goal scaling value is output by the model. In this embodiment, a bid is determined by multiplying a base or initial goal with the output goal scaling value. An adjustable goal may be represented as CPA(u;w;a) in the following:

$$\text{bid} = p(u;w;a) \times \text{scale}(u;w;a) \times \text{base\_CPA} \quad [2]$$

where scale(u;w;a) is the model; base_CPA is the base CPA.

In another implementation, the final bid value is output by the model and there is no associated base goal value. In this example, a bid may be determined as follows:

$$\text{bid} = p(u;w;a) \times \text{CPA}(u;w;a) \quad [3]$$

In another embodiment, an advertiser provides a model for determining an action probability p(u;w;a). That is, an advertiser can provide a model that can be deployed to determine all or any portion of the parameters of a bid.

The bid can be said to be a measure of how much value D puts on this advertisement opportunity. The best bid and its associated ad specifications are found and sent to the ad exchange system, which sent or forwarded the bid request, in operation 414. For example, the DSP D responds back to E with its best bid and information on the corresponding ad 134, specifying how to retrieve the best bid's ad's creative content (e.g., the actual image corresponding to the ad).

The ad exchange E 112 may run an internal auction using all the bids it has received from multiple DSPs 102 and determine the winning bid and the corresponding ad. The auction may also compute how much the winner DSP (not necessarily D) is to be charged and how much the publisher P 110 is to be paid. The ad exchange E 112 sends the final winning bid and ad specification 136 to Publisher P.

Figure 5:
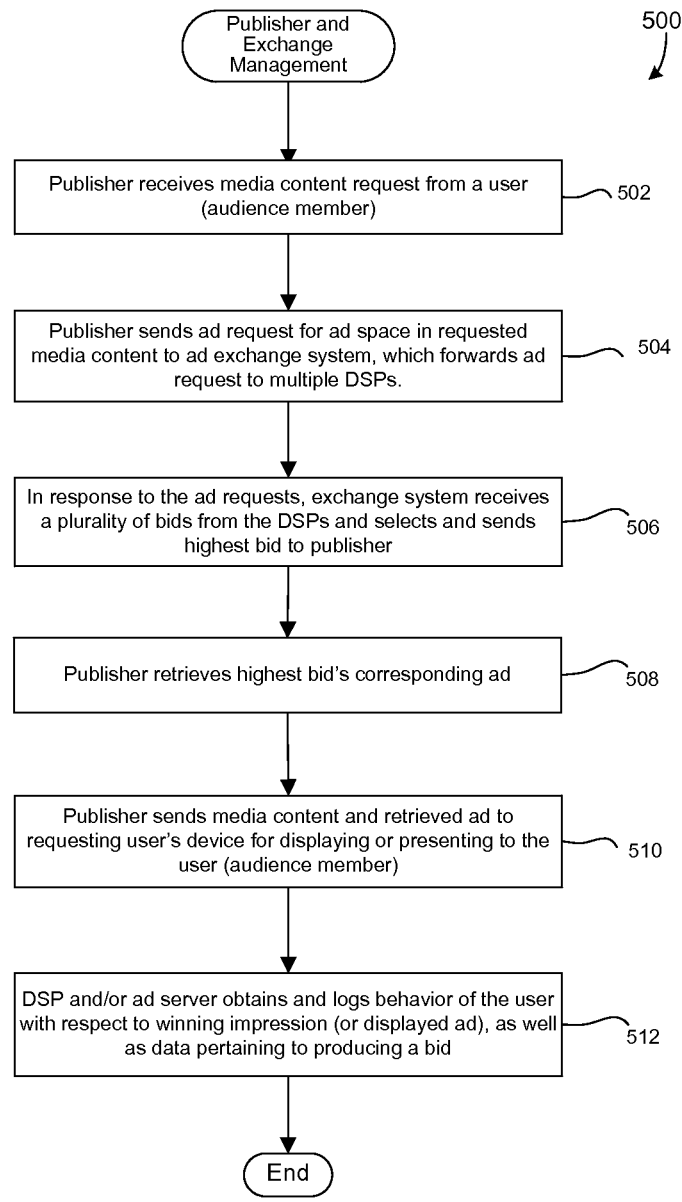
FIG. 5 is a flow chart illustrating a publisher and ad exchange process.

From the publisher's and bid exchange's perspective, FIG. 5 is a flow chart illustrating a publisher and exchange management process 500. Initially, a publisher 110 receives a media content request from a user (audience member) in operation 502. For instance, a user sends a URL request for a web page or object to a publisher P server. The publisher P 110 then sends an ad request for an available ad space in the requested media content to an exchange system E 112, which forwards such request to multiple DSPs, in operation 504. In response, to this ad request, the ad exchange system E 112 receives a plurality bids (e.g., bid 134) from a plurality of DSPs 102, including DSP D, in operation 506. The exchange may select the highest bid from among all bids from multiple DSPs and send the highest bid to the publisher.

Publisher P 110 uses the information sent by the exchange system E 112 to retrieve the highest bid's corresponding ad 118 in operation 508. For example, the publisher uses location data that is sent with the highest bid to retrieve the ad creative from a particular ad server 116. The ad server 116 from which the ad creative is retrieved may be the winner DSP or a third party ad server (more likely).

The publisher sends the media content and retrieved ad to the requesting user's device for displaying or presenting to the user (or audience member) in operation 510. The ad is preferably delivered and integrated into the media content before the requesting user u sees the web page w fully loaded. That is, the entire flow from a user u requesting the web page w to obtaining the ad can happen faster than the blink of an eye (about 300 milliseconds) so that when u finally sees w, it appears as if w always had the ad as part of its content. Excluding the latency for at least three round-trips over the network, DSPs 102 may have at most 50 milliseconds to propose their bids. Moreover, in early 2013, top DSPs can get as many as one million bid requests per second (one half to one third of the number of page views worldwide per second circa 2012).

DSPs may obtain and log signals when they win an impression, for example, through their own ad server if the DSP's serve the ad creative or user browsers when the ad is shown to the user. These signals may be logged by the DSPs and/or ad servers. DSPs and/or ad associated servers may obtain and log other data that are produced during their bid determination. That is, DSPs and/or ad servers can obtain and log data with respect to a winning impression, as well as data pertaining to producing a bid, in operation 512. These logs may be periodically polled by (or pushed to) distributed processors (such as Hadoop) to process and extract campaign performance data. Other entities in the real-time bidding pipeline may also log lots of bidding and/or ad data for their own decision making process. These logs may also be shared between these entities. For example, ad server logs may be shared by DSPs. The extracted campaign data may be provided by the ad servers to campaign managers, for example, through a web interface or the like. This logged data may be used by any entity to adjust any parameter associated with bid determination or any campaign parameter.

Certain embodiments of the present invention allow campaign managers to create campaigns that adjust goals on the fly, in real-time, on a per impression basis. The advertiser can provide a model having flexible goal adjustment functions based on different user or media content characteristics for each impression.

Embodiments of the present invention may be implemented in any suitable network environment. The network may take any suitable form, such as a wide area network or Internet and/or one or more local area networks (LAN's). The network may be in the form of a data, mobile, cellular, plain old telephone network (POTN), or any combination thereof. Referring back to FIG. 1, the network 100 may include any suitable number and type of devices, e.g., routers and switches, for forwarding requests from each client to a particular server application, forwarding application results back to the requesting clients, or forwarding data between various servers or processing devices.

Embodiments of the present invention may also be practiced in a wide variety of network environments including, for example, TCP/IP-based networks (e.g., Rate Control Protocol or RCP, Transport Control Protocol or TCP, Fast TCP, Stream-based TCP/IP or STCP, eXplicit Control Protocol or XCP, etc.), telecommunications networks, wireless networks, mobile networks, etc., or any combination thereof. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be affected or employed at different locations.

The disclosed techniques of the present invention may be implemented in any suitable combination of software and/or hardware system, such as a web-based server or desktop computer system. An apparatus for implementing one or more portions of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Figure 6:
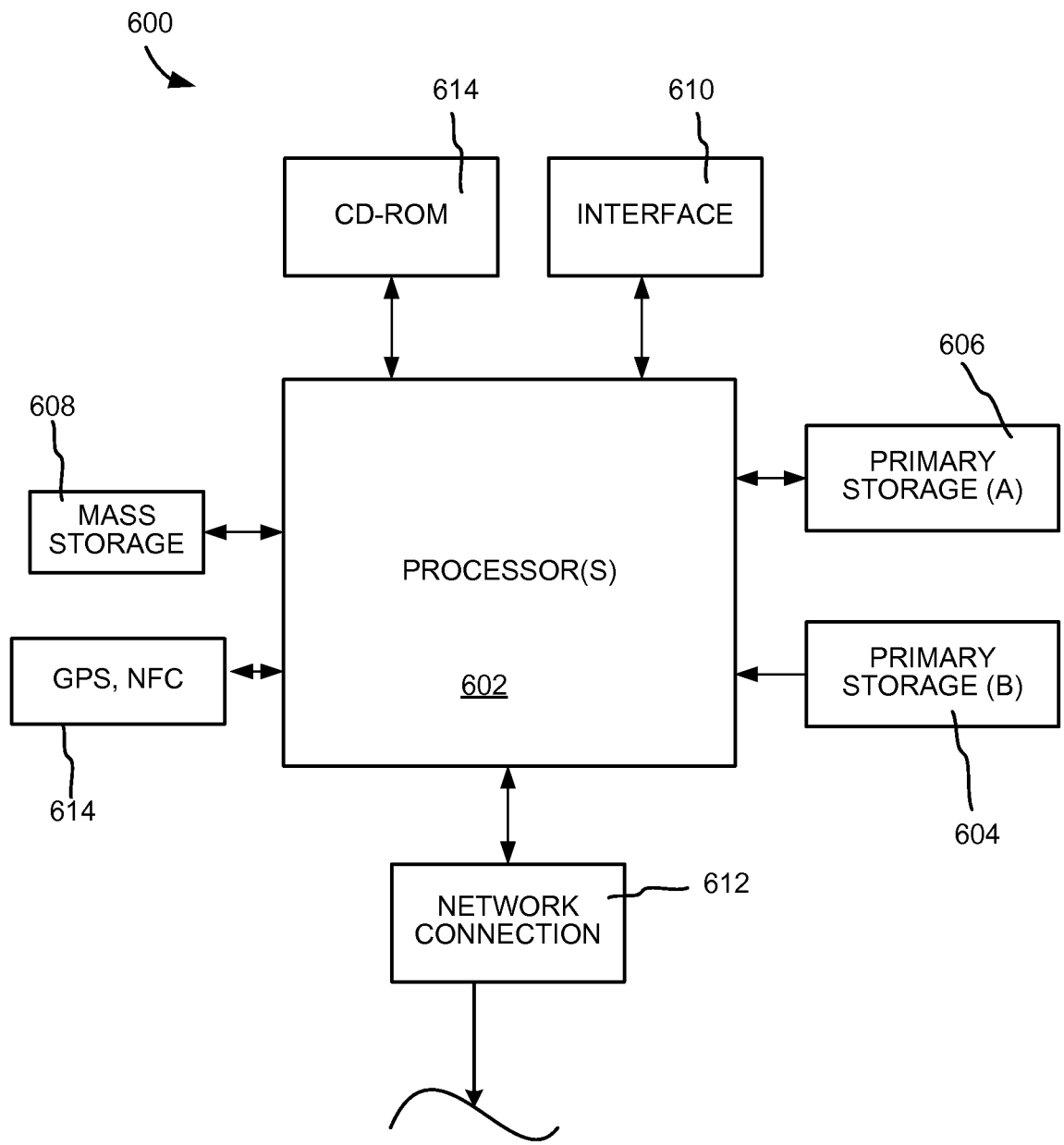
FIG. 6 illustrates a typical computer system that, when appropriately configured or designed, can serve as a system for implementing at least portions of the process embodiments described herein.

FIG. 6 illustrates a typical computer system that, when appropriately configured or designed, can serve as a bid determination system for implementing at least portions of the process embodiments described herein. The computer system 600 includes any number of processors 602 (also referred to as central processing units, or CPUs) that are coupled to storage devices including primary storage 606 (typically a random access memory, or RAM), primary storage 604 (typically a read only memory, or ROM). CPU 602 may be of various types including microcontrollers and microprocessors such as programmable devices (e.g., CPLDs and FPGAs) and unprogrammable devices such as gate array ASICs or general-purpose microprocessors. As is well known in the art, primary storage 604 acts to transfer data and instructions uni-directionally to the CPU and primary storage 606 is used typically to transfer data and instructions in a bi-directional manner. Both of these primary storage devices may include any suitable computer-readable media such as those described herein. A mass storage device 608 is also coupled bi-directionally to CPU 602 and provides additional data storage capacity and may include any of the computer-readable media described herein. Mass storage device 608 may be used to store programs, data and the like and is typically a secondary storage medium such as a hard disk. It will be appreciated that the information retained within the mass storage device 608, may, in appropriate cases, be incorporated in standard fashion as part of primary storage 606 as virtual memory. A specific mass storage device such as a CD-ROM 614 may also pass data uni-directionally to the CPU.

CPU 602 is also coupled to an interface 610 that connects to one or more input/output devices such as such as video monitors or displays, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 602 optionally may be coupled to an external device such as a database or a computer or telecommunications network using an external connection as shown generally at 612. With such a connection, it is contemplated that the CPU might receive information from the network, or might output information to the network in the course of performing the method steps described herein. CPU 602 may also be coupled with any other suitable internal devices, such as a GPS device or NFC device 614.

According to various embodiments, input may be obtained using a wide variety of techniques. For example, input for downloading or launching an application may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

A network may also include mass storage, such as network attached storage (NAS), a storage area network (SAN), or other forms of computer or machine readable storage media, for example. Regardless of the system's configuration (e.g., client or server), it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the present invention relates to machine readable storage media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that are specially configured to store and perform program instructions, such as ROM and RAM. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method for bidding on placement of advertisements within media content over a computer networking environment, the method comprising:
    at each of one or more data management platforms,
        aggregating advertising and non-advertising data from one or more data suppliers, the advertising and non-advertising data including user profile data and media content profile data, wherein the user profile data comprises user characteristics and the media content profile data comprises media content characteristics,
        generating data mappings between the user profile data and user identifiers (IDs),
        generating data mappings between the media content profile data and universal resource locators (URLs), and
        transmitting the user profile data, the media content profile data, and corresponding data mappings to a first demand side platform;
    at the first demand side platform,
        storing the user profile data, media content profile data, and corresponding data mappings in a profile database,
        receiving one or more model files including a first model file, wherein each model file specifies a model for determining an adjustment score for adjusting performance goal values based on a combination of one or more of: user profile data and media content profile data associated with one or more advertisement requests, and
        receiving, from a first advertiser, a first set of campaign specifications for a plurality of first advertisements, wherein the first set of campaign specifications specifies: at least one first advertisement, a budget, the performance goal value, and the first model file;
    at an ad exchange server,
        receiving a first advertisement request, from a publisher server, for placement of an advertisement on a first advertisement space that is within media content that has been requested by a first user for display at a first user device,
            wherein the first advertisement request includes a combination of one or more of: a first set of user profile data associated with the first user and a first set of media content profile data associated with the media content, and
        transmitting the first advertisement request to a plurality of demand side platforms including the first demand side platform;
    at the first demand side platform,
        for the first advertisement request, inputting a combination of one or more of the first set of user profile data and the first set of media content profile data into the first model file to determine a first adjustment score,
        for each of the plurality of first advertisements, determining a bid for placement of such first advertisement on the first advertisement space, wherein each bid is determined based on at least the first adjustment score and the performance goal value,
        selecting a first bid from the plurality of determined bids, the first bid corresponding to a selected advertisement of the plurality of first advertisements, and
        sending the first bid, along with a reference to the selected advertisement, to the ad exchange server, wherein the reference includes a location of an ad creative file for the selected advertisement on a host server;
    at the ad exchange server,
        determining the first bid as a winning bid for finalizing purchase of placement of the selected advertisement on the first advertisement space, and
        sending the winning bid and the reference to the selected advertisement to the publisher server; and
    at the publisher server,
        retrieving the ad creative file from the host server, and
        transmitting the ad creative file to the first user device such that the selected advertisement is rendered for display at the first user device along with the requested media content.

2. The method of claim 1, further comprising: for each model file of the one or more model files,
    determining if the model file passes a set of predefined criteria;
    if the model file passes the set of predefined criteria, converting the model file into a corresponding executable model;
    determining if the corresponding executable model passes one or more runtime constraints; and
    if the model passes the one or more runtime constraints, storing the corresponding executable model for attaching to one or more sets of campaign specifications from one or more advertisers.

3. The method of claim 2, wherein the set of predefined criteria includes a requirement that each model file only use a predefined set of variables as input for its specified model.

4. The method of claim 1, further comprising: at the first demand side platform,
    receiving a second set of campaign specifications for a plurality of second advertisements, wherein the second set of campaign specifications specify a constant performance goal value and a plurality of constraints,
    for the first advertisement request, filtering the second advertisements based on whether the first set of user profile data and media content profile data meet each of the plurality of constraints specified by the second set of campaign specifications, and
    for each of the filtered second advertisements, determining a bid for placement of such second advertisement on the first advertisement space based on the constant performance goal value specified by the second set of campaign specifications.

5. The method of claim 1,
wherein the first set of campaign specifications for the first advertisements is associated with a plurality of constraints;
wherein the method further comprises filtering the first advertisements based on whether the first set of user profile data and media content profile data associated with such each first advertisement meet each of the constraints; and
wherein bids are only determined for the filtered first advertisements.

6. The method of claim 1, wherein the performance goal value of the first model file is a cost per action (CPA) value.

7. The method of claim 1, wherein the performance goal value of the first model file is a cost per click (CPC) value.

8. The method of claim 1, wherein the performance goal value of the first model file is a cost per thousand impressions (CPM) value.

9. The method of claim 1, wherein the first model file is specified as sharable and attached to first advertisements corresponding to different sets of campaign specifications from different advertisers.

10. The method of claim 9, wherein the first model file is sold to the first advertiser or a model builder, wherein the first advertiser and model builder are not involved with creating the first model file.

11. The method of claim 1, wherein the model specified by the first model file is configured to determine the first adjustment score based on user characteristics specified by the first set of user profile data including one or more of the following: age, gender, and location of the first user.

12. The method of claim 11, wherein the location of the first user includes a state and direct marketing area (DMA).

13. The method of claim 1, wherein each bid for each of the plurality of first advertisements is further determined based on a probability of a user action with respect to an advertisement.

14. The method of claim 1, wherein the model specified by the first model file is configured to determine the first adjustment score based on different combinations of a plurality of user characteristics associated with different advertisement requests.

15. The method of claim 14, wherein the different combinations of a plurality of user characteristics include different combinations of user demographics and different other contextual factors that affect user behavior differently.

16. The method of claim 1, wherein the model specified by the first model file is configured to determine the first adjustment score based on different combinations of one or more of the following: user characteristics, media content characteristics, and advertisement characteristics.

17. The method of claim 1, wherein the first model file is received at the first demand side platform from the first advertiser.

18. The method of claim 1, wherein the user profile data is stored at the first demand side platform with an anonymized type of user identifier.

19. A system for bidding on placement of advertisements within media content over a computer networking environment, the system comprising memory and one or more processors configured to perform the following operations:
at each of one or more data management platforms,
aggregating advertising and non-advertising data from one or more data suppliers, the advertising and non-advertising data including user profile data and media content profile data,
generating data mappings between the user profile data and user identifiers (IDs),
generating data mappings between the media content profile data and universal resource locators (URLs), and
transmitting the user profile data, the media content profile data, and corresponding data mappings to a first demand side platform;
at the first demand side platform,
storing the user profile data, media content profile data, and corresponding data mappings in a profile database,
receiving a model file specifying a model for determining an adjustment score for adjusting a performance goal value based on a combination of one or more of: user profile data and media content profile data associated with one or more advertisement requests, and
receiving, from an advertiser, a first set of campaign specifications for a plurality of first advertisements, wherein the first set of campaign specifications specifies: at least one first advertisement, a budget, the performance goal value, and the model file;
at an ad exchange server,
receiving a first advertisement request, from a publisher server, for placement of an advertisement on a first advertisement space that is within media content that has been requested by a first user for display at a first user device,
wherein the first advertisement request includes a combination of one or more of: a first set of user profile data associated with the first user and a first set of media content profile data associated with the media content, and
transmitting the first advertisement request to a plurality of demand side platforms including the first demand side platform;
at the first demand side platform,
for the first advertisement request, inputting a combination of one or more of the first set of user profile data and the first set of media content profile data into the model file to determine the adjustment score,
for each of the plurality of first advertisements, determining a bid for placement of such first advertisement on the first advertisement space, wherein each bid is determined based on at least the adjustment score and the performance goal value,
selecting a first bid from the plurality of determined bids, the first bid corresponding to a selected advertisement of the plurality of first advertisements, and
sending the first bid, along with a reference to the selected advertisement, to the ad exchange server, wherein the reference includes a location of an ad creative file for the selected advertisement on a host server;
at the ad exchange server,
determining the first bid as a winning bid for finalizing purchase of placement of the selected advertisement on the first advertisement space, and
sending the winning bid and the reference to the selected advertisement to the publisher server; and
at the publisher server,
retrieving the ad creative file from the host server, and transmitting the ad creative file to the first user device such that the selected advertisement is rendered for display at the first user device along with the requested media content.

20. At least one non-transitory computer readable storage medium having computer program instructions stored thereon that are arranged to perform the following operations:

at each of one or more data management platforms,
aggregating advertising and non-advertising data from one or more data suppliers, the advertising and non-advertising data including user profile data and media content profile data,
generating data mappings between the user profile data and user identifiers (IDs),
generating data mappings between the media content profile data and universal resource locators (URLs), and
transmitting the user profile data, the media content profile data, and corresponding data mappings to a first demand side platform;

at the first demand side platform,
storing the user profile data, media content profile data, and corresponding data mappings in a profile database,
receiving a model file specifying a model for determining an adjustment score for adjusting a performance goal value based on a combination of one or more of: user profile data and media content profile data associated with one or more advertisement requests, and
receiving, from an advertiser, a first set of campaign specifications for a plurality of first advertisements, wherein the first set of campaign specifications specifies: at least one first advertisement, a budget, the performance goal value, and the model file;

at an ad exchange server,
receiving a first advertisement request, from a publisher server, for placement of an advertisement on a first advertisement space that is within media content that has been requested by a first user for display at a first user device,
wherein the first advertisement request includes a combination of one or more of: a first set of user profile data associated with the first user and a first set of media content profile data associated with the media content, and
transmitting the first advertisement request to a plurality of demand side platforms including the first demand side platform;

at the first demand side platform,
for the first advertisement request, inputting a combination of one or more of the first set of user profile data and the first set of media content profile data into the model file to determine the adjustment score,
for each of the plurality of first advertisements, determining a bid for placement of such first advertisement on the first advertisement space, wherein each bid is determined based on at least the adjustment score and the performance goal value,
selecting a first bid from the plurality of determined bids, the first bid corresponding to a selected advertisement of the plurality of first advertisements, and
sending the first bid, along with a reference to the selected advertisement, to the ad exchange server, wherein the reference includes a location of an ad creative file for the selected advertisement on a host server;

at the ad exchange server,
determining the first bid as a winning bid for finalizing purchase of placement of the selected advertisement on the first advertisement space, and
sending the winning bid and the reference to the selected advertisement to the publisher server; and at the publisher server,
retrieving the ad creative file from the host server, and
transmitting the ad creative file to the first user device such that the selected advertisement is rendered for display at the first user device along with the requested media content.

* * * * *